US010181043B1

(12) United States Patent
Pauley, Jr. et al.

(10) Patent No.: US 10,181,043 B1
(45) Date of Patent: Jan. 15, 2019

(54) METHOD AND APPARATUS FOR COOKIE VALIDATION AND SCORING

(71) Applicant: EMC IP HOLDING COMPANY LLC, Hopkinton, MA (US)

(72) Inventors: Wayne A. Pauley, Jr., Hudson, NH (US); Stephen J. Todd, Shrewsbury, MA (US); Michel F. Fisher, Natick, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 575 days.

(21) Appl. No.: 13/631,019

(22) Filed: Sep. 28, 2012

(51) Int. Cl.
| | |
|---|---|
| *G06F 17/00* | (2006.01) |
| *H04L 29/06* | (2006.01) |
| *G06F 21/62* | (2013.01) |

(52) U.S. Cl.
CPC .............. *G06F 21/62* (2013.01); *H04L 63/04* (2013.01); *H04L 63/20* (2013.01)

(58) Field of Classification Search
CPC .......... G06F 21/00; G06F 21/10; G06F 21/60; H04L 63/04; H04L 63/20
USPC ............................................................ 726/1
See application file for complete search history.

(56) References Cited

U.S. PATENT DOCUMENTS

| | | | | |
|---|---|---|---|---|
| 6,751,734 | B1 * | 6/2004 | Uchida ........................ | 713/186 |
| 8,474,046 | B1 * | 6/2013 | Gong et al. .................... | 726/23 |
| 8,555,085 | B2 * | 10/2013 | Khoury ......................... | 713/189 |
| 2008/0172745 | A1 * | 7/2008 | Reinart et al. ................. | 726/26 |
| 2009/0296657 | A1 * | 12/2009 | Omar et al. ................... | 370/331 |
| 2010/0235877 | A1 * | 9/2010 | Hu et al. .......................... | 726/1 |
| 2010/0241844 | A1 * | 9/2010 | Hussain et al. ............... | 713/150 |
| 2012/0291087 | A1 * | 11/2012 | Agrawal .......................... | 726/1 |

FOREIGN PATENT DOCUMENTS

| | | | | |
|---|---|---|---|---|
| EP | 2192543 | A1 * | 6/2003 | ............. G06Q 90/00 |
| EP | 2192543 | A1 * | 6/2010 | ............. G06Q 90/00 |

\* cited by examiner

*Primary Examiner* — Dant Shaifer Harriman
(74) *Attorney, Agent, or Firm* — Robert Kevin Perkins; Andre Gibbs (57) ABSTRACT

Example embodiments of the present invention provide a method, an apparatus, and a computer program product for correlating privacy-related portions of a data stream with information indicative of a privacy policy. The method includes receiving privacy-related portions of a data stream transmitted from a source intended for a destination and receiving information indicative of a privacy policy associated with the destination. The privacy-related portions of the data stream then may be correlated with the information indicative of the privacy policy. According to this correlation, the privacy-related portions of the data stream may be forwarded to the destination.

21 Claims, 5 Drawing Sheets

METHOD AND APPARATUS FOR COOKIE VALIDATION AND SCORING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application is related to U.S. patent application Ser. No. 13/247,423 entitled "METHOD AND APPARATUS FOR FRIENDLY MAN-IN-THE-MIDDLE DATA STREAM INSPECTION", Ser. No. 13/247,549 entitled "METHOD AND APPARATUS FOR PRIVACY-RESPECTING NOTIFICATION OF SECURITY THREATS", and Ser. No. 13/247,623 entitled "METHOD AND APPARATUS FOR ENCRYPTION WITH VIEWER IDENTITY- AND CONTENT ADDRESS-BASED IDENTITY PROTECTION", filed on Sep. 28, 2011; Ser. No. 13/340,104 entitled "TIME-BASED ANALYSIS OF DATA STREAMS" and Ser. No. 13/340,007 entitled "DATA TRACKING FOR PROVENANCE AND CHAIN OF CUSTODY GENERATION", filed on Dec. 29, 2011; Ser. No. 13/436,702 entitled "METHOD AND APPARATUS FOR COOKIE ANONYMIZATION AND REJECTION" filed on Mar. 30, 2012; and Ser. No. 13/536,337 entitled "METHOD AND APPARATUS FOR MAN-IN-THE-MIDDLE AGENT-ASSISTED CLIENT FILTERING", Ser. No. 13/536,501 entitled "METHOD AND APPARATUS FOR CONTENT, ENDPOINT, AND PROTOCOL MAN-IN-THE-MIDDLE USER INTERFACE", and Ser. No. 13/536,637 entitled "DIGITAL DISAPPEARING INK" filed on Jun. 28, 2012, the teachings of which are hereby incorporated by reference in their entirety.

TECHNICAL FIELD

This application relates to data privacy.

BACKGROUND

Privacy is the claim of individuals, groups or institutions to determine for themselves when, how, and to what extent information about them is communicated to others. Private information is frequently made public or semi-public via emails, blogs and postings to social networking services, such as Facebook, Twitter, LinkedIn and FourSquare, often without foresight as to the consequences of such a divulgence. It has been reported that information publicly posted to social networking services has been used in firing individuals from their employment and has been used by criminals to find targets for burglaries.

Additionally, intentionally divulged information that is intended to be maintained as private is routinely sold to advertisers and information brokers. Moreover, with the proliferation of app usage in mobile devices, additional information is available on the "information market," including users' location, age, gender, income, ethnicity, sexual orientation and political views. As recently reported by the Wall Street Journal, of 101 popular smartphone apps, 56 transmitted the device ID without the user's consent, 47 sent location information, and 5 sent age, gender and other personally identifiable information to outsiders.

SUMMARY

Example embodiments of the present invention provide a method, an apparatus, and a computer program product for correlating privacy-related portions of a data stream with information indicative of a privacy policy. The method includes receiving privacy-related portions of a data stream transmitted from a source intended for a destination and receiving information indicative of a privacy policy associated with the destination. The privacy-related portions of the data stream then may be correlated with the information indicative of the privacy policy. According to this correlation, the privacy-related portions of the data stream may be forwarded to the destination.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

As the number of Internet-connected devices in the home and the enterprise continues to rise, the concept of privacy is increasingly caught in the midst of two divergent forces: that individual, group or institution's likely desire to maintain information as private, and the increasing vulnerability of such information to a privacy breach or unintended disclosure. Internet-connected devices in the household/enterprise may include personal computers, laptop computers, televisions, audiovisual receivers, music players, radios, appliances and gaming systems. While many of these devices have a method to block Internet access wholesale, they lack finer-grain controls for limiting Internet access.

For example, current methods for controlling the disclosure of private information include centralized devices that block wholesale access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms). Moreover, while many of these devices provide logging capabilities, the rapidly increasing number of such devices and the amount of information they log removes from the realm of possibility an administrator's ability to police those logs to determine, albeit after the fact, private information that was disclosed.

Therefore, a centralized point of control is desirable that performs a contextual analysis of content of privacy-related portions of a data stream. Within the household, for example, a broadband router is generally a common access point for most home-based Internet-connected devices. In other words, example embodiments of the present invention provide an intelligent layer implemented, for example, in the router (or as a standalone device) that can inspect the payload of a data stream for keywords and employ a blocking or masking mechanism to protect unauthorized or potentially harmful data from escaping the household (i.e., intentional or accidental), irrespective of source-type (i.e., agentless) and in a manner transparent to the destination.

Part of the content flowing over the network is cookies/beacons. Cookies provide an unknown leakage of private information from internal systems to external networks. One example of a cookie is a key-click cookie, which enables marketing for every click that a user is making and is often associated with free applications. That cookie may contain sensitive information like name, age, sex, location, account numbers, etc. Malware can hijack cookies and accelerate the leakage of information by continually uploading sensitive information at a very high rate. Web beacons leak user activity between websites out to external sources.

As understood in the art, these objects are buffers that may be filtered and examined. However, traditional packet inspectors typically only look at fingerprint, source, and destination information, but do not inspect at the content level. Therefore, content-aware drill-down analysis of cookies/beacons may enable an administrator to decipher cookie content and establish one or more policies to either block or anonymize cookies/beacons. Further, the pace and frequency of cookies can also be viewed.

Cookies and beacons typically provide an unknown leakage of private information from internal systems to an external network. Further, privacy statements (e.g., from web sites) infer intent of usage of information that is intentionally gathered or unintentionally leaked.

For example, in certain situations, a key-click cookie may enable marketing for every click that a user makes and is often associated with free apps. A key-click cookie may contain sensitive information (e.g., name, age, sex, location, account numbers etc.). The site generating the key-click cookie also may provide a policy stating the usage policies intended by the collecting party; however, the policy may not be presented contextually or correlated with the data. In other situations, malware may hijack cookies and accelerate the leakage of information by continually uploading sensitive information at a very high frequency. In these situations, malware sites may actually be missing a privacy policy or the policy may be missing key elements. In yet other situations, web beacons leak user activity between websites out to external sources and beacon collection sites' intentions for the data may or may not be explicitly outlined in their privacy policy.

Example embodiments of the present invention provide a method, an apparatus, and a computer program product for correlating privacy-related portions of a data stream with information indicative of a privacy policy. For example, certain embodiments may correlate information from cookie/beacon generator site(s) with privacy policy information on the site semantically evaluating the policy for privacy tenets for exposures. The privacy tenets (e.g., Organisation for Economic Co-operation and Development (OECD) guidelines, European Union (EU) privacy framework, and Federal Trade Commission (FTC) privacy recommendations) such as opt-in, permission, consent, notice, etc., may be used in certain embodiments to create a sliding scale score indicative of, for example, risk. That score then may be used to either transform the cookie/beacon or to generate an event and expose the relative score (e.g., went from yellow to red).

Example embodiments of the present invention may target cookies and beacons and correlate them with the data collector's privacy policies which, in turn, may be used to score the relative risk of sharing the data. This may allow a policy engine to, in certain embodiments, perform a full block of the data or present an adjusted risk score to an end user for them to make a decision on whether to release the collected data or not.

Example embodiments of the present invention may provide a context leakage report based on a cookie/beacon correlation analysis with the privacy policies along the privacy tenets dimensions (e.g., notice, access, consent, and permissions).

Other example embodiments of the present invention may detect sudden cookie/beacon appearance, which may indicate the presence of malware within the system. With the data correlated with the collector's privacy policy (or lack thereof), a determination can be made on whether to block, allow, or mask the data. In addition, the site may be more effectively blacklisted with a score.

In another example embodiment of the present invention, a relative score index may be created with the correlated data, including white listed, black listed, and grey listed sites, based on outcome of the score.

In yet another example embodiment of the present invention, scoring may provide a benchmark to determine if the site changes either the types of data collected in the cookie/beacon or in the privacy policy.

Figure 1:
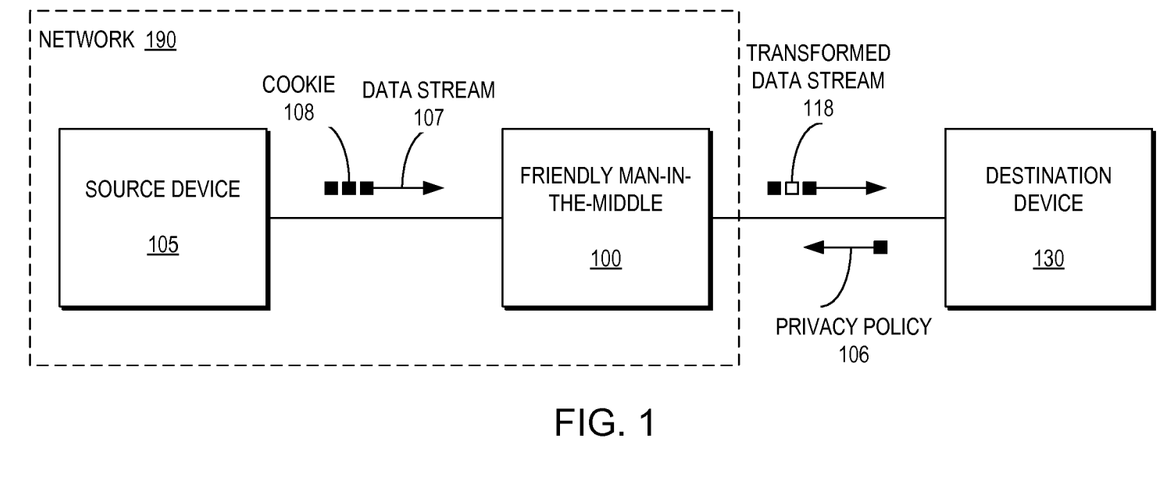
FIG. 1 is a block diagram illustrating a system including a friendly man-in-the-middle deployed in a network environment according to an example embodiment of the present invention.

FIG. 1 is a block diagram illustrating a system including a friendly man-in-the-middle 100 deployed in a network environment 190 according to an example embodiment of the present invention. As illustrated in FIG. 1, the network 190 includes a source device 105 that may transmit a data stream 107, including a cookie 108, intended for a destination (e.g., destination device 130). However, a friendly (i.e., blessed) man-in-the-middle (FMITM) 100 receives (i.e., intercepts) the data stream 107 before the data stream escapes the network 190 toward the destination device 130. As will be discussed in greater detail below, the FMITM 100 receives information indicative of a privacy policy 106 associated with the destination device 130 and correlates the information indicative of the privacy policy 106 with the privacy-related portions of the data stream 107 (i.e., content/payload of cookies 108 included in the data stream 107). The FMITM 100 then forwards the privacy-related portions of the data stream 107 (i.e., cookie 108) to the destination device 130 out of the network 190 to the intended destination device 130 as a transformed data stream 118 according to the correlation. It should be noted that, in certain embodiments, the transformed data stream 118 may be a blocking of the cookie 108 or an anonymization of the cookie 108.

Figure 2:
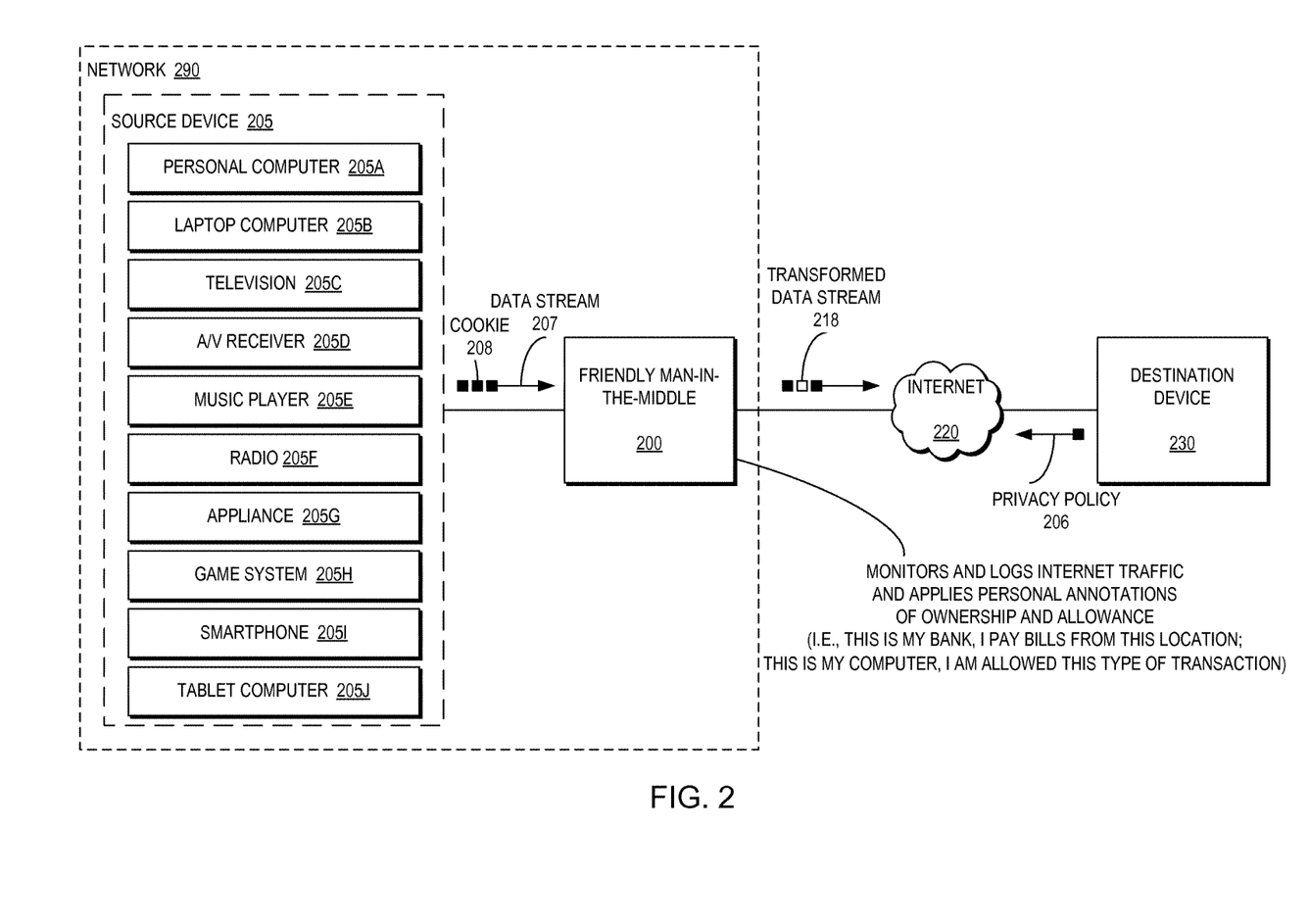
FIG. 2 is a block diagram illustrating a system including a friendly man-in-the-middle deployed in an Internet-based environment, including a plurality of source devices, according to an example embodiment of the present invention.

FIG. 2 is a block diagram illustrating a system including a friendly man-in-the-middle 200 deployed in an Internet-based environment, including a plurality of source devices, according to an example embodiment of the present invention. As illustrated in FIG. 2, the network 290 includes a source device 205 (e.g., personal computer 205A, laptop computer 205B, television 205C, A/V receiver 205D, music player 205E, radio 205F, appliance 205G, game system 205H, smartphone 205I, and table computer 205J) that may transmit a data stream 207, including a cookie 208, intended for a destination (e.g., destination device 230). However, a FMITM 200 receives (i.e., intercepts) the data stream 207 before the data stream escapes the network 290 toward the destination device 230 over the Internet 220. It should be understood that the FMITM 200 may intercept both wired (e.g., over Ethernet) and wireless (e.g., over WiFi) data streams 207 in the network 290.

Likewise, the FMITM 200 may include additional hardware, such as a picocell, from a cellular telephony carrier to permit the FMITM 200 to intercept wireless communications (i.e., voice and data) from cellular telephones, tablet computers and the like connected to the cellular telephony carrier (e.g., over 3G or 4G connections). The FMITM 200 receives information indicative of a privacy policy 206 associated with the destination device 230 and correlates the information indicative of the privacy policy 206 with the privacy-related portions of the data stream 207 (i.e., content/payload of cookies 208 included in the data stream 207). In certain embodiments, the information indicative of a privacy policy 206 associated with the destination device 230 indicates the privacy intentions of a third party associated with the destination device 230.

The FMITM 200 then forwards the privacy-related portions of the data stream 207 (i.e., cookie 208) to the destination device 230 out of the network 290 to the intended destination device 230 as a transformed data stream 218 according to the correlation. In other embodiments, the FMITM 200 may include hardware to act as a repeater for the cellular telephony carrier so that it may intercept wireless communications and forward them back to the cellular telephony carrier's network (e.g., 3G or 4G network).

Figure 3:
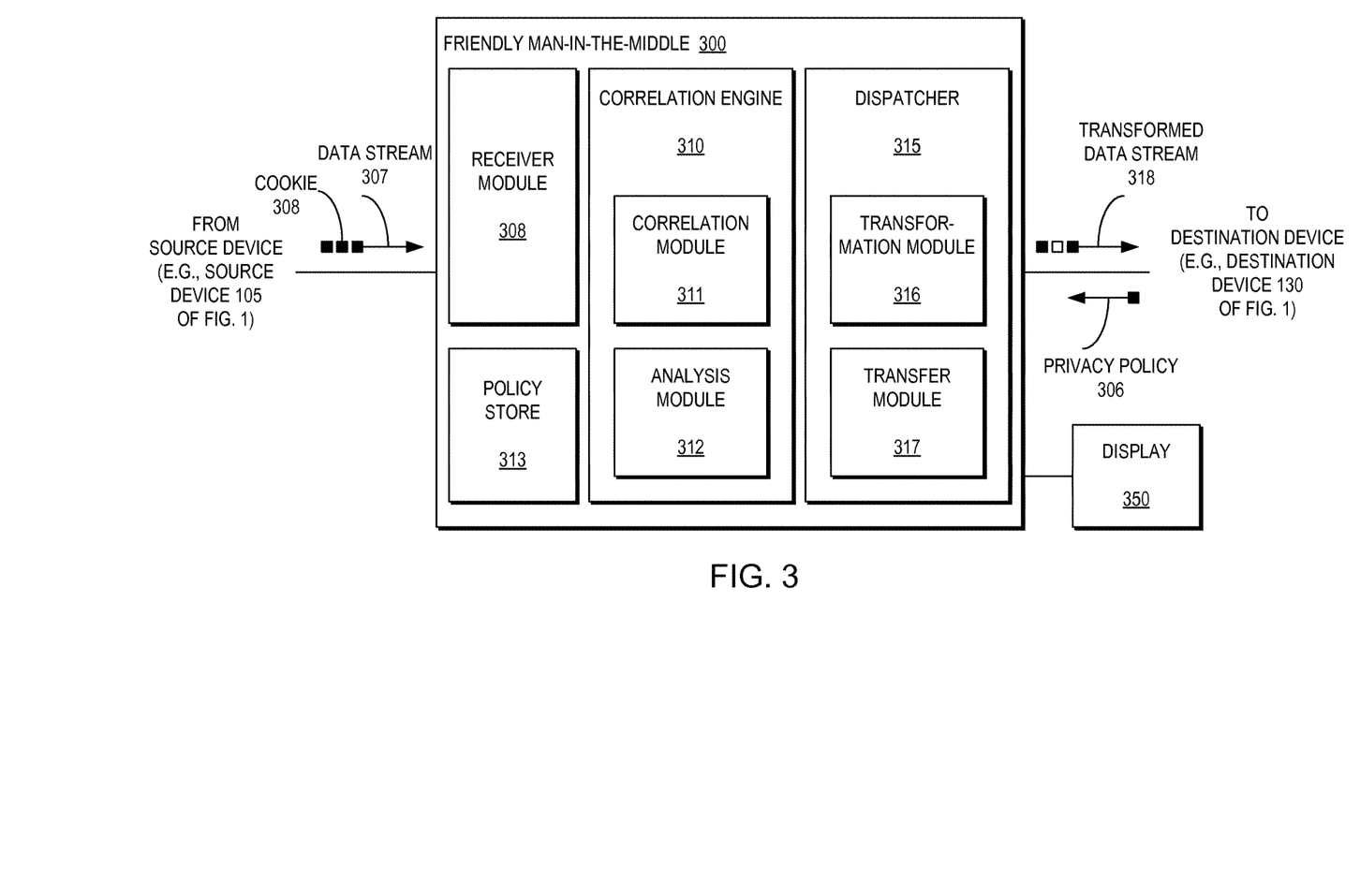
FIG. 3 is a block diagram illustrating a friendly man-in-the-middle according to example embodiments of the present invention.

FIG. 3 is a block diagram illustrating a friendly man-in-the-middle according to example embodiments of the present invention. FIGS. 4-7 are flow diagrams illustrating methods according to example embodiments of the present invention. FIGS. 3 and 4-7 may be described in conjunction.

Figure 4:
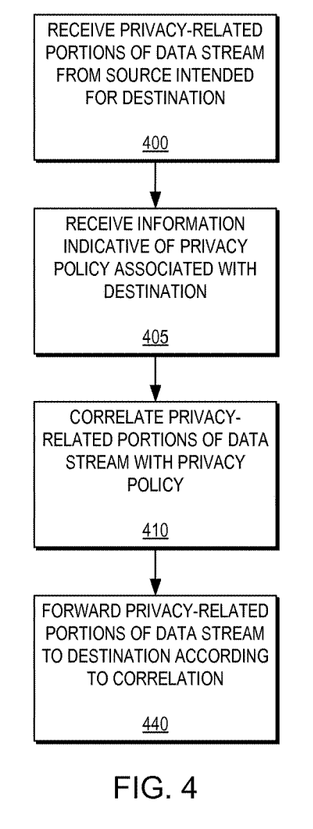
FIG. 4 is a flow diagram illustrating a method for correlating privacy-related portions of a data stream with information indicative of a privacy policy according to an example embodiment of the present invention.

FIG. 4 is a flow diagram illustrating a method for correlating privacy-related portions of a data stream with information indicative of a privacy policy according to an example embodiment of the present invention. As illustrated in FIGS. 3 and 4, a FMITM 300 includes a receiver module 308 configured to receive privacy-related portions of a data stream 307, including a cookie 308, transmitted from a source (e.g., source device 105 of FIG. 1) intended for a destination (e.g., destination device 130 of FIG. 1) (400). The receiver module 308 also may receive information indicative of a privacy policy 306 associated with the destination (405).

The privacy policy information 306 may be included in a site's privacy notice describing what kinds of information are harvested and how long the information is kept. As will be described below, the FMITM 300 may determine whether it is a trusted site based on a correlation of actions (i.e., what information the FMITM 300 detects the site is collecting) and the intentions of that site as expressed in its policies 306.

Privacy notices, such as for a web site, typically are located at the bottom of every page as a link. The FMITM 300 may scour a page for such a privacy link. In certain embodiments, the FMITM 300 may build a privacy profile for the site according to the privacy policy 306 information. For example, the analysis module 312 may parse the text, which typically is standard language (e.g., notice: we maintain the right to notify you of changes to our privacy notice at any time; we will give you 30 days to opt out before it takes effect; we collect your data and keep it for 170 days after we collect it).

Additionally, many websites bring in utilities/tools from other web properties (e.g., partners) that may misbehave with respect to the privacy policy of the website. For example, a user may browse to a website and examine the privacy policy. However, unknown to the user, advertisements from an advertisement service provider on the website may use cookies to mine information about the user. It should be noted that, in such situations, it is not the website that controls the advertisements but rather it is the advertisement service provider. Accordingly, cookies/beacons may not adhere to the privacy policy of the website, despite the fact that the user has browsed to the website's URL. In certain embodiments, the advertisement service provider may have its own privacy policy, but it is not specified as the website's partner. In certain embodiments, as traffic flows through the FMITM 300, it would know where the cookie 308 is coming from to determine if it's the destination website collecting information in violation of its privacy policy 306 or a third party service provider (i.e., the destination address for the cookie would not be within the domain of the web site).

Accordingly, example embodiments of the present invention are able to determine in an out-of-band process whether information is being leaked from the user or a source device that does not comply 306 with the privacy policy of the website, for example, or what is expected by the user by correlating the intention of the website, for example, as expressed in its privacy policy 306 and the behavior detected by the FMITM 300. In certain embodiments, the FMITM 300 may trace the cookie 208 back to its origin (e.g., the service provider) and try to find a privacy policy agreement for the service provider. In certain embodiments, if the FMITM 300 is unable to find a privacy policy, it may flag the service provider (e.g., by URL or IP address) as an unknown exposure of privacy information. In other embodiments, it the FMITM 300 is able to determine the privacy policy for the third party service provider, then, based on that policy, the FMITM 300 may determine whether it should allow additional privacy-related information to the third party service provider. In yet other embodiments, the FMITM 300 may transform the data stream 318 so that the privacy-related information shared with the third-party service provider is no more than the privacy-related information shared with the destination website, which is what is expected from a user perspective.

The privacy policy information 306 may be stored in a policy store 313. A correlation engine 310 then may correlate the privacy-related portions of the data stream 307 with the information indicative of the privacy policy 306 (410). In certain embodiments, the correlation engine 310 may comprise a correlation module 311 configured to correlate the privacy-related portions of the data stream 307 with the information indicative of the privacy policy 306. A dispatcher 315 then may forward the privacy-related portions of the data stream 318 (i.e., a transformed data stream) to the destination device (e.g., destination device 130 of FIG. 1) according to the correlation performed by the correlation engine 310 (440). In certain embodiments, the dispatcher 315 may comprise a transfer module 317 configured to forward the privacy-related portions of the data stream 318 to the destination device.

In certain embodiments, to correlate the privacy-related portions of the data stream with the information indicative of a privacy policy, the correlation engine 310 may comprise an analysis module 312 configured to determine a risk associated with forwarding the privacy-related portions of the data stream 307 to the destination device.

Figure 5:
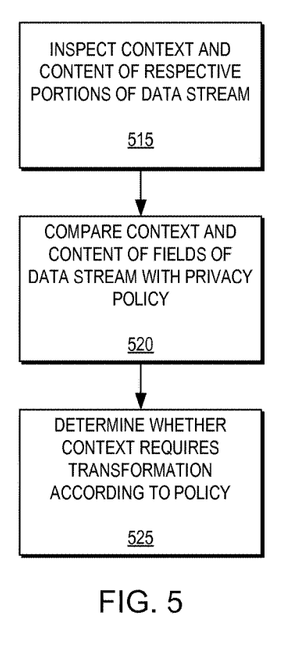
FIG. 5 is a flow diagram illustrating a method for determining whether the context and the content of the respective privacy-related fields of the data stream require transformation of the content of the respective privacy-related fields according to a policy.

FIG. 5 is a flow diagram illustrating a method for determining whether the context and the content of the respective privacy-related fields of the data stream 307 requires transformation of the content of the respective privacy-related fields according to a policy 313. The policy 313 may be a policy as described in U.S. patent application Ser. No. 13/247,423 entitled "METHOD AND APPARATUS FOR FRIENDLY MAN-IN-THE-MIDDLE DATA STREAM INSPECTION" filed on Sep. 28, 2011, the teachings of which are hereby incorporated by reference in their entirety.

As illustrated in FIG. 5, the analysis module 312 may be configured to inspect context and content of respective privacy-related fields of the data stream 207 (515) and compare the context and content of the respective privacy-related fields of the data stream 207 with the information indicative of the privacy policy 206 associated with the destination 230 (520). The analysis module 312 then may determine whether the context and the content of the respective privacy-related fields of the data stream 207 requires transformation of the content of the respective privacy-related fields according to a policy 313 (525).

In order to determine whether the context and the content of the respective privacy-related fields of the data stream 307 requires transformation of the content of the respective privacy-related fields according to a policy 313, the analysis module 312 may generate a score indicative of the severity of divergence of the context and content of the respective privacy-related fields of the data stream 307 from the information indicative of the privacy policy 306 associated with the destination. The score may be adjusted according to how the site uses privacy-related information. For example, if the site says it retains data indefinitely, the risk score goes up; if the site says that it shares the data with numerous, but unspecified, affiliates, the score goes up. In certain embodiments, a display 350 may provide an indication of the score to a user. In certain embodiments, a report may be generated summarizing cookie 308 behavior, how many sites have received what data, scoring index, and which privacy tenets are used by the data collector. Further, the user may override the determination of whether the context and the content of the respective privacy-related fields of the data stream 307 requires transformation of the content of the respective privacy-related fields according to the policy. In certain embodiments, the score may be evolved over time as the privacy policy 306 for the site may change.

Figure 6:
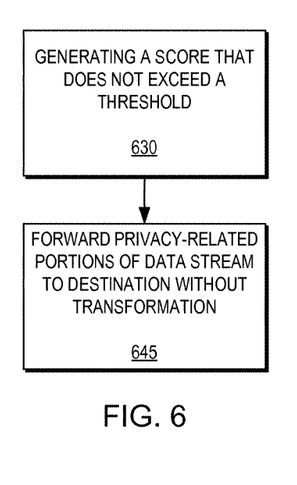
FIG. 6 is a flow diagram illustrating a method for forwarding the privacy-related portions of the data stream to the destination without transformation according to a score that does not exceed a threshold.

FIG. 6 is a flow diagram illustrating a method for forwarding the privacy-related portions of the data stream 307 to the destination without transformation according to a score that does not exceed a threshold. As illustrated in FIG. 6, if the score does not exceed a threshold (630), the transfer module 317 may forward the privacy-related portions of the data 307 stream to the destination without transformation (645).

Figure 7:
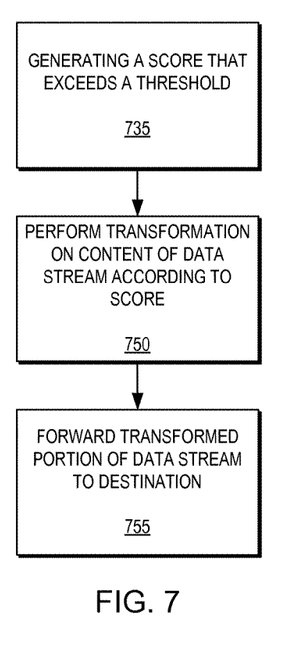
FIG. 7 is a flow diagram illustrating a method for performing a transformation on the content of privacy-related portions of a data stream according to a score indicative of the severity of divergence of the context and content of respective privacy-related fields of the data stream from information indicative of the privacy policy associated with a destination and forwarding the transformed portion of the data stream to the destination.

FIG. 7 is a flow diagram illustrating a method for performing a transformation on the content of privacy-related portions of a data stream 307 according to a score indicative of the severity of divergence of the context and content of respective privacy-related fields of the data stream 307 from information indicative of the privacy policy 306 associated with a destination and forwarding the transformed portion of the data stream 318 to the destination. As illustrated in FIG. 7, if the score exceeds a threshold (735), the transformation module 316 may perform a transformation on the content of the privacy-related portions of the data stream 307 according to the score indicative of the severity of divergence of the context and content of the respective privacy-related fields of the data stream 307 from the information indicative of the privacy policy 306 associated with the destination (750). The transfer module 317 then may forward the transformed portion of the data stream 318 to the destination (755).

Figure 8:
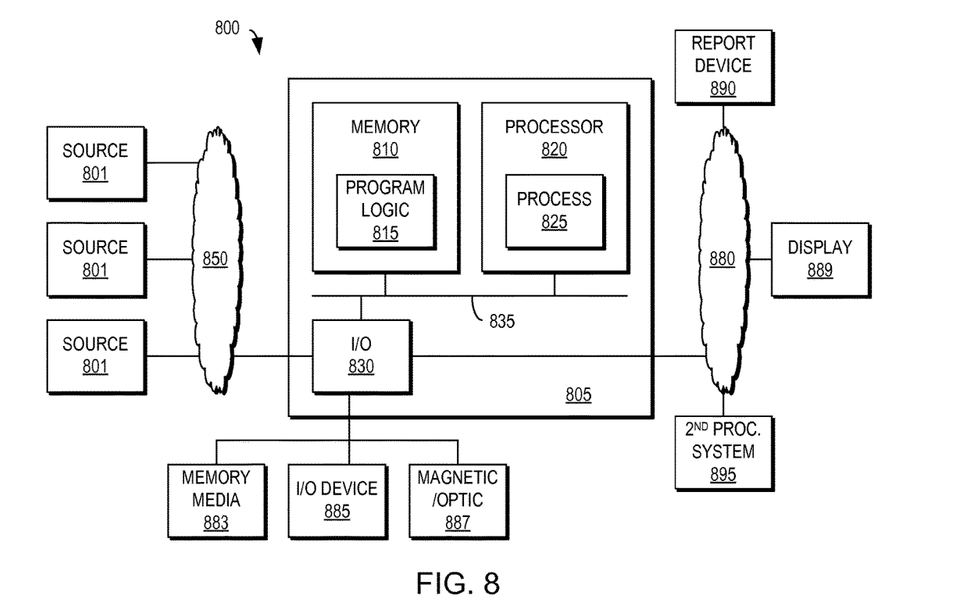
FIG. 8 is a block diagram illustrating an apparatus according to an example embodiment the present invention.

FIG. 8 is a block diagram of a FMITM 805 according to an example embodiment of the present invention. The FMITM 805 may be in a system 800 and includes memory 810 storing program logic 815, a processor 820 on which a privacy correlation process 825 may be running, and a communications (i.e., I/O) interface 830, all of which may be coupled via, for example, a bus 835.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 9:
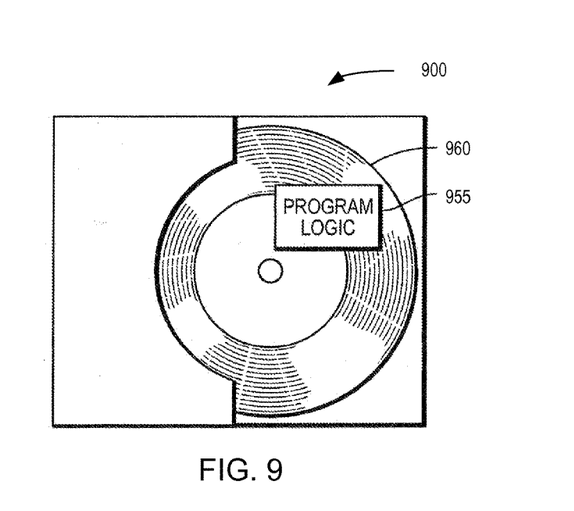
FIG. 9 is an illustration of an apparatus as embodied in program code according to an example embodiment of the present invention.

FIG. 9 is an illustration of an apparatus as embodied in program code according to an example embodiment of the present invention. FIG. 9 shows program logic 955 embodied on a computer-readable medium 960 as shown, and wherein the logic is encoded in computer-executable code configured for carrying out the methods of this invention and thereby forming a computer program product 900.

The logic for carrying out the method may be embodied as part of the aforementioned system, which is useful for carrying out a method described with reference to embodiments shown in, for example, FIGS. 1-7. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
receiving privacy-related portions of a data stream transmitted from a source device in a network intended for a destination device outside the network by an intercepting device in the network before the data stream escapes the network toward the destination device;
receiving at the intercepting device information indicative of a privacy policy associated with the destination device;
correlating by the intercepting device the privacy-related portions of the data stream with the information indicative of the privacy policy; and
forwarding the privacy-related portions of the data stream from the intercepting device out of the network to the destination device according to the correlation.

2. The method of claim 1 wherein correlating by the intercepting device the privacy-related portions of the data stream with the information indicative of a privacy policy comprises determining a risk associated with forwarding the privacy-related portions of the data stream from the intercepting device out of the network to the destination device.

3. The method of claim 2 wherein determining a risk associated with forwarding the privacy-related portions of the data stream from the intercepting device out of the network to the destination device comprises:
inspecting context and content of respective privacy-related fields of the data stream;
comparing the context and content of the respective privacy-related fields of the data stream with the information indicative of the privacy policy associated with the destination device; and
determining whether the context and the content of the respective privacy-related fields of the data stream requires transformation of the content of the respective privacy-related fields according to a policy.

4. The method of claim 3 wherein determining whether the context and the content of the respective privacy-related fields of the data stream requires transformation of the content of the respective privacy-related fields according to a policy comprises generating a score indicative of the severity of divergence of the context and content of the respective privacy-related fields of the data stream from the information indicative of the privacy policy associated with the destination device.

5. The method of claim 4
wherein generating a score indicative of the severity of divergence of the context and content of the respective privacy-related fields of the data stream from the information indicative of the privacy policy associated with the destination device comprises generating a score that does not exceed a threshold; and
wherein forwarding the privacy-related portions of the data stream from the intercepting device out of the network to the destination device according to the correlation comprises forwarding the privacy-related portions of the data stream from the intercepting device out of the network to the destination device without transformation.

6. The method of claim 4
wherein generating a score indicative of the severity of divergence of the context and content of the respective privacy-related fields of the data stream from the information indicative of the privacy policy associated with the destination device comprises generating a score that exceeds a threshold; and
wherein forwarding the privacy-related portions of the data stream from the intercepting device out of the network to the destination device according to the correlation comprises:
performing a transformation on the content of the privacy-related portions of the data stream according to the score indicative of the severity of divergence of the context and content of the respective privacy-related fields of the data stream from the information indicative of the privacy policy associated with the destination device; and
forwarding the transformed portion of the data stream from the intercepting device out of the network to the destination device.

7. The method of claim 4 further comprising providing an indication of the score to a user.

8. The method of claim 7 further comprising enabling the user to override the determination of whether the context and the content of the respective privacy-related fields of the data stream requires transformation of the content of the respective privacy-related fields according to the policy.

9. The method of claim 3 further comprising evolving the policy according to the score.

10. The method of claim 1 wherein the information indicative of a privacy policy associated with the destination device indicates the privacy intentions of a third party associated with the destination device and wherein the destination device is under control of the third party.

11. An apparatus comprising:
a receiver module configured to receive privacy-related portions of a data stream transmitted from a source device in a network intended for a destination device outside the network before the data stream escapes the network toward the destination device and information indicative of a privacy policy associated with the destination device;
a correlation engine configured to correlate the privacy-related portions of the data stream with the information indicative of the privacy policy; and
a dispatcher configured to forward the privacy-related portions of the data stream out of the network to the destination device according to the correlation.

12. The apparatus of claim 11 wherein the correlation comprises an analysis module configured to determine a risk associated with forwarding the privacy-related portions of the data stream out of the network to the destination device.

13. The apparatus of claim 12 wherein the analysis module is further configured to inspect context and content of respective privacy-related fields of the data stream, compare the context and content of the respective privacy-related fields of the data stream with the information indicative of the privacy policy associated with the destination device, and determine whether the context and the content of the respective privacy-related fields of the data stream requires transformation of the content of the respective privacy-related fields according to a policy.

14. The apparatus of claim 13 wherein the analysis module is further configured to generate a score indicative of the severity of divergence of the context and content of the respective privacy-related fields of the data stream from the information indicative of the privacy policy associated with the destination device.

15. The apparatus of claim 14 wherein the score does not exceed a threshold and wherein the dispatcher comprises a transfer module configured to forward the privacy-related portions of the data stream out of the network to the destination device without transformation.

16. The apparatus of claim 14 wherein the score exceeds a threshold and wherein the dispatcher comprises:
   a transformation module configured to perform a transformation on the content of the privacy-related portions of the data stream according to the score indicative of the severity of divergence of the context and content of the respective privacy-related fields of the data stream from the information indicative of the privacy policy associated with the destination device; and
   a transfer module configured to forward the transformed portion of the data stream out of the network to the destination device.

17. The apparatus of claim 14 further comprising an interface to a display to provide an indication of the score to a user.

18. The apparatus of claim 17 wherein the display enables the user to override the determination of whether the context and the content of the respective privacy-related fields of the data stream requires transformation of the content of the respective privacy-related fields according to the policy.

19. The apparatus of claim 13 wherein the correlation module is further configured to evolve the policy according to the score.

20. The apparatus of claim 11 wherein the information indicative of a privacy policy associated with the destination device indicates the privacy intentions of a third party associated with the destination device and wherein the destination device is under control of the third party.

21. A computer program product including a non-transitory computer-readable storage medium encoded with computer-program code that, when executed on a processor of a computer, causes the computer to correlate privacy-related portions of a data stream with information indicative of a privacy policy, the computer program product comprising:
   computer program code for receiving privacy-related portions of a data stream transmitted from a source device in a network intended for a destination device outside the network by an intercepting device in the network before the data stream escapes the network toward the destination device;
   computer program code for receiving information indicative of a privacy policy associated with the destination device;
   computer program code for correlating the privacy-related portions of the data stream with the information indicative of the privacy policy; and
   computer program code for forwarding the privacy-related portions of the data stream from the intercepting device out of the network to the destination device according to the correlation.

* * * * *